US007886328B2

(12) United States Patent
Bertin (10) Patent No.: US 7,886,328 B2
(45) Date of Patent: Feb. 8, 2011

(54) PROTOCOL AND SYSTEM FOR BROADCASTING AUDIOVISUAL PROGRAMS FROM A SERVER

(75) Inventor: Christian Bertin, Rennes (FR)

(73) Assignee: France Telecom, Paris (FR)

( * ) Notice: Subject to any disclaimer, the term of this patent is extended or adjusted under 35 U.S.C. 154(b) by 1228 days.

(21) Appl. No.: 10/479,374

(22) PCT Filed: May 31, 2002

(86) PCT No.: PCT/FR02/01835

§ 371 (c)(1),
(2), (4) Date: Dec. 1, 2003

(87) PCT Pub. No.: WO02/100018

PCT Pub. Date: Dec. 12, 2002

(65) Prior Publication Data

US 2004/0163122 A1 Aug. 19, 2004

(30) Foreign Application Priority Data

Jun. 6, 2001 (FR) .................................. 01 07396

(51) Int. Cl.
*H04N 7/173* (2006.01)
*G06F 15/16* (2006.01)
*G06F 15/177* (2006.01)
*H04L 12/40* (2006.01)
*H04H 20/28* (2008.01)

(52) U.S. Cl. ........................ 725/116; 725/109; 709/200; 709/220; 709/228; 709/231; 370/487; 370/438

(58) Field of Classification Search ...................... None
See application file for complete search history.

(56) References Cited

U.S. PATENT DOCUMENTS

| 5,721,823 A | * | 2/1998 | Chen et al. | .................. | 709/203 |
| 6,700,624 B2 | * | 3/2004 | Yun | .......................... | 348/555 |
| 7,103,667 B1 | * | 9/2006 | Bell et al. | .................... | 709/227 |
| 7,181,526 B1 | * | 2/2007 | Bell et al. | .................... | 709/231 |

(Continued)

FOREIGN PATENT DOCUMENTS

WO         WO 98/51041 A1    11/1998

OTHER PUBLICATIONS

Handley et al., "SDP: Session Description Protocol," Network Working Group, Request for Comments: 2327, Category: Standards Track, XP002101463 (Apr. 1998).

(Continued)

*Primary Examiner*—Andrew Y Koenig
*Assistant Examiner*—Mark D Featherstone
(74) *Attorney, Agent, or Firm*—Drinker Biddle & Reath LLP (57) ABSTRACT

The invention concerns a protocol for broadcasting to a terminal (T) audio-visual materials (PG) from an audio-visual server, comprising a signalling source (SS) and an audio-visual source (SAV). The protocol consists, via an IP network, in acquiring (A) a descriptive file of the source (SS), in acquiring (B) from the source (SS) based on the file SDP, a broadcast signalling channel (SC), and in receiving (C) on said terminal from the signalling channel (SC) at least a digital data flow supporting the audio-visual materials (PG). The invention is useful for broadcasting audio-visual materials on INTERNET.

19 Claims, 3 Drawing Sheets

U.S. PATENT DOCUMENTS

| | | | | |
|---|---|---|---|---|
| 7,284,257 B1 * | 10/2007 | Estipona | .................... | 725/50 |
| 2002/0016969 A1 * | 2/2002 | Kimble | .................... | 725/87 |
| 2002/0116473 A1 * | 8/2002 | Gemmell | .................... | 709/219 |
| 2002/0141365 A1 * | 10/2002 | Leung | .................... | 370/335 |

OTHER PUBLICATIONS

International Search Report established for PCT/FR02/01835.

\* cited by examiner

PROTOCOL AND SYSTEM FOR BROADCASTING AUDIOVISUAL PROGRAMS FROM A SERVER

FIELD OF THE INVENTION

The invention relates to a protocol and a system for broadcasting audiovisual programs from a server, by INTERNET network.

BACKGROUND OF THE INVENTION

Due to the growth and the increasing interest of mass-market users in respect of exchanges of digital data supporting audiovisual programs or files over the INTERNET network, numerous services, aimed at catering for the broadcasting of such audiovisual sources, have been proposed hitherto.

Among them may be mentioned the following main services:

WEB TV Service

Such a service makes it possible, by consulting a WEB site, to retrieve a URL address (Uniform Resource Locator address) so as to request an audiovisual content directly. This content is not broadcast but duplicated and transmitted by the source as many times as there are users connected.

The consulting of a televised program transmitted in this mode involves the user connecting up each time to the aforesaid WEB site, so as to request a content currently being broadcast.

The information on the content of the program and the description of the mode of broadcasting is implicit or provided by the WEB site on request.

Multicast Over the MBone Service

Figure 1A:
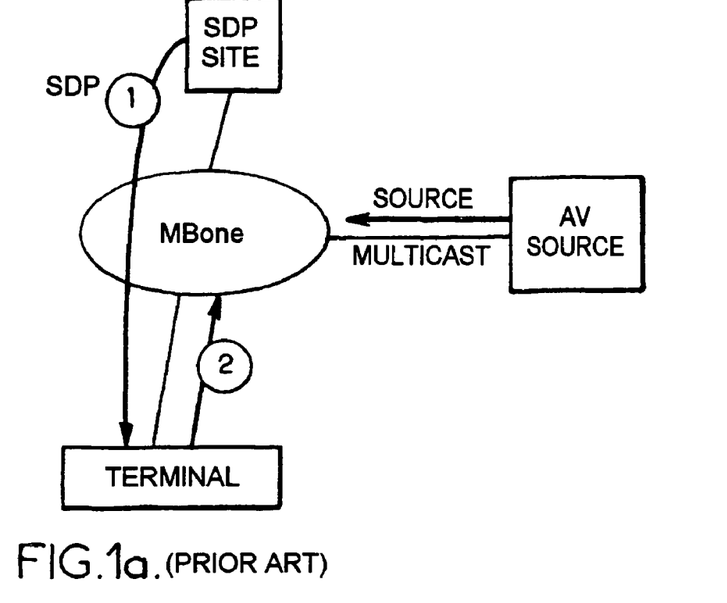

With reference to FIG. 1a, within the context of this service, the SDP data structure available for each audiovisual source is used (1) to find (2) all the information necessary for placing in receive mode by the IGMP protocol, RFC 2236: Internet Group Management Protocol, for an audiovisual source AV with the appropriate protocols and decoders.

An exemplary SDP data structure is given hereinbelow:
v=0
o=mhandley 2890844526 2892842807 IN IP4 126.16.64.4
s=SDP Seminar
i=A Seminar on the session description protocol
u=http://www.cs.ucl.ac.uk/staff/M.Handlry/sdp.03.ps
e=mjh@isi.edu(Mark Handley)
c=IN IP4 224.217.12/127
t=2873397496 2873404696
a=recvonly
m=audio 49170 RTP/AVP 0
m=video 51372 RTP/AVP 31
m=application 32416 udp wb
a=orient: portrait DVB SI Service Telebroadcast digital broadcasting in Europe, either by satellite or by cable or over the airwaves, is based on the specifications drawn up by the DVB forum. The DVB/SI specification defines the way of broadcasting, in a television multiplex, the information necessary for the acquisition of each of the programs broadcast in this multiplex. This mode implies that the reception terminal be capable of receiving the entire multiplex, for example 40 Mbits/s for a satellite, so as to be able to extract the program or programs chosen by the user.

IP SAT Service

In the case of this service, a means of broadcasting, the satellite, has to be used to transmit at high bit rate data destined for one or more destination users, usually on the request of users. The broadcast is then activated by the requesters.

IETF Service

The IETF has defined a data structure which makes it possible to convey information on the contents and all the information useful to the terminals to acquire them, either by downloading, or by placing oneself in receive mode for a broadcasting channel (RFC 2327: SDP: Session Description Protocol).

The aforesaid services consist, essentially, in placing in the SDP structure retrieved, either from a WEB site, or from an electronic message, all the information necessary in order to be able to place oneself in receive mode for the audiovisual source. Such a modus operandi assumes that the aforesaid information does not change during transmission.

Figure 1B:
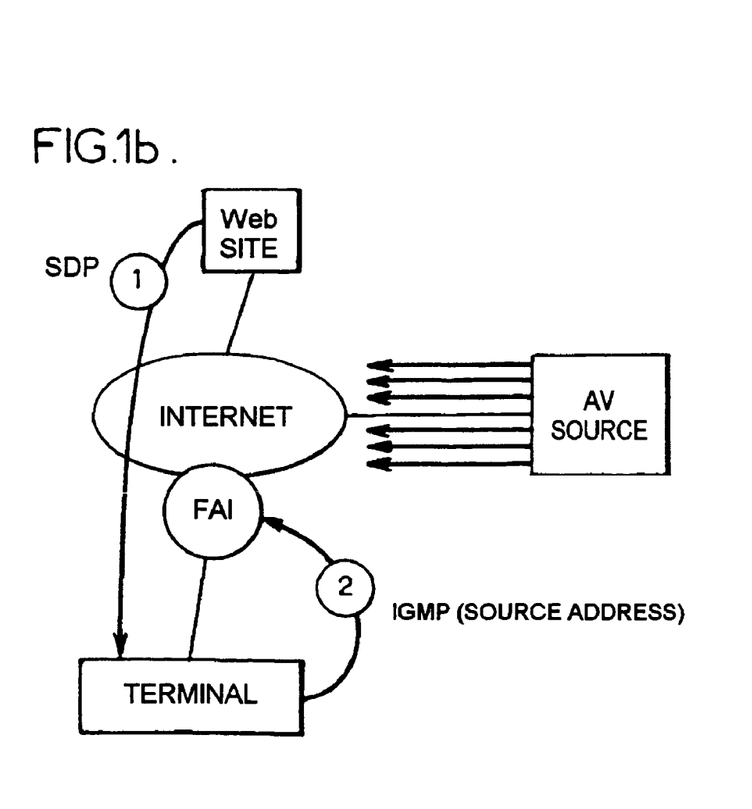

Represented in FIG. 1b is an audiovisual source AV connected to the INTERNET network and that broadcasts in multicast a televised program on several streams.

Several techniques can be used to serve a dispersed population of terminals with modes of hookup of these terminals that are very diversified, such as for example telephone network with modems having various bit rates, ADSL, cable, satellite, ISDN, or the like.

Either the televised program is broadcast at different bit rates at 20, 40 or 60 kbits/s for example, or the signal is split into several streams, a base stream at 20 kbits/s and one or more complementary streams at 10 or 20 kbits/s that make it possible to improve the quality of the signal conveyed by the base stream for a broadcast to terminals linked to the switched telephone network. The audiovisual source AV always transmits toward the INTERNET network, whether or not there is a taker terminal for this transmission. It may be concluded that, at the start of the transmission, all the streams transmitted by the audiovisual source stop in the first appliance of the network, failing a request of a terminal for example.

When a terminal is configured to receive the televised program, it uses the information contained in the SDP data structure to obtain the address of the audiovisual source, its mode of broadcasting and of coding. It can then proceed to the choice of the digital stream or streams that it is capable of receiving and transmit a request to receive the audiovisual source via the IGMP protocol, providing the broadcasting address of the chosen channel. The operation is repeated as many times as the terminal has chosen this stream.

A path is then constructed by switching between the receiving terminal and the closest FAI router which is already receiving the digital stream supporting the requested telebroadcast program originating from the audiovisual source.

The aforesaid prior art solution has the drawback of the absence of synchronization between the moment at which the terminal retrieves the SDP data structure and the moment at which the terminal places itself in receive mode for the audiovisual source. Thus, for a regularly televised program broadcast on INTERNET, the user connects up once to the WEB site of the station broadcasting this televised program so as to retrieve the SDP structure, and, subsequently, places his terminal in receive mode for this audiovisual source, each time he so desires, without reconnecting to the aforesaid WEB site.

Any change of the conditions of reception of the terminal, such as subscription, access network or the like, renders the information contained in the SDP structure null and void.

Any change of the mode of broadcasting of the audiovisual source, such as a change of format, transmission title, indication of end of transmission, mode of scrambling or the like, renders the information available in the SDP structure originating from a WEB site null and void.

OBJECTS OF THE INVENTION

An object of the present invention is to remedy the drawbacks of the aforesaid prior art techniques and solutions and the invention makes provision, in order to permit adaptation to any abovementioned change, to use a signaling broadcasting channel, associated with the broadcasting channel of the audiovisual source, at low bit rate and whose characteristics are invariable over time. These characteristics may consequently be included in the SDP structure.

Another object of the present invention is also the implementation of a protocol and of a system for broadcasting audiovisual programs making it possible to confer great flexibility on the audiovisual sources for changing mode of broadcasting at any moment, in particular upon a change of image format, of coding type, of bit rate or the like, in the absence of any disturbance of the receiving terminals and of intervention by the users.

Another object of the present invention is also the implementation of a signaling channel affording information on the televised program currently being broadcast on INTERNET or broadcast later, without it being necessary from time to time to access the WEB site of the station carrying out this broadcast.

Another object of the present invention is also the implementation of a signaling channel making it possible to convey enciphering information synchronized with the changes of transmissions originating from the audiovisual source.

Another object of the present invention is finally the implementation of a signaling channel capable of being received by all the receiving terminals, this signaling channel being, for this reason, totally separate from the stream or streams of the contents of the broadcast programs, which may attain high bit rates and which, consequently, cannot therefore be received by all the terminals.

SUMMARY OF THE INVENTION

A method for broadcasting audiovisual programs from an audiovisual server, comprising a signaling source and an audiovisual source, to a terminal by way of an IP type network, which is the subject of the present invention, consists, from said terminal, in acquiring a file descriptive of said signaling source, and subsequent to the acquisition of said file, in acquiring from said signaling source, on the basis of said file, a broadcast signaling channel, and on the basis of said broadcast signaling channel, in receiving, on said terminal, at least one digital data stream supporting said audiovisual program.

The system for broadcasting audiovisual programs from an audiovisual server to a set of terminals interconnected by way of the INTERNET network, which is the subject of the present invention, is noteworthy in that this server comprises a signaling source allowing the reception, from said terminals, of a signaling stream broadcast in multicast and an audiovisual source allowing the reception, from said terminals, of a digital data stream supporting the audiovisual program broadcast in multicast.

The protocol and the system which are the subjects of the invention find application to the broadcasting of audiovisual programs on the INTERNET, or on IP type network, whether the mode of access to these audiovisual programs be on demand, by pre-paid access, by subscription or the like.

BRIEF DESCRIPTION OF THE DRAWINGS

They will be better understood on reading the description and on looking at the drawings hereinbelow in which, in addition to FIG. 1a and FIG. 1b relating to the prior art:

FIG. 2b represents, by way of illustration, a first variant implementation of the protocol which is the subject of the present invention, illustrated in FIG. 2a;

FIG. 2c represents, by way of illustration, a second variant implementation of the protocol which is the subject of the present invention, illustrated in FIG. 2a;

MORE DETAILED DESCRIPTION

A more detailed description of the protocol for broadcasting audiovisual programs from an audiovisual server in accordance with the subject of the present invention will now be given in conjunction with FIGS. 2a to 2c.

Figure 2A:
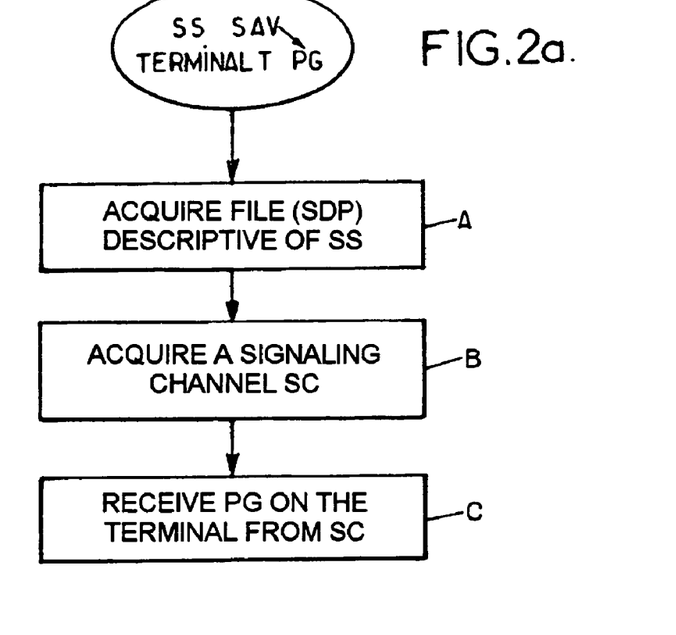
FIG. 2a represents a flowchart illustrative of the protocol which is the subject of the present invention.

With reference to FIG. 2a it is indicated that the protocol which is the subject of the present invention is implemented on the basis of a signaling source SS and of an audiovisual source SAV making it possible to broadcast programs PG to a terminal T by way of a network of IP type, for example.

It is understood that the audiovisual server comprises the signaling source SS and the aforesaid audiovisual source SAV.

With reference to FIG. 2a, the protocol which is the subject of the present invention consists from the terminal T in a step A in acquiring a file descriptive of the signaling source SS.

Subsequent to the acquisition of the aforesaid file, at the level of the terminal T, step A is followed by a step B consisting in acquiring from the signaling source SS on the basis of the file acquired a broadcast signaling channel. By acquisition of a broadcast signaling channel it is indicated that the terminal T is in a position to acquire the call and reception parameters of the aforesaid broadcast signaling channel.

Step B can then be followed by a step C consisting in receiving on the terminal T at least one digital data stream supporting the audiovisual program PG. Of course, the reception on the terminal of the digital data stream supporting the audiovisual program PG is performed by way of the signaling channel SC.

In a general manner, it is indicated that the protocol which is the subject of the invention makes it possible to offer great flexibility of use to the audiovisual sources for changing mode of broadcasting at any moment when necessary and in particular upon a change of form to the image, of type of coding, of the bit rate or other transmission parameter, without however disturbing the receivers and without intervention by the users.

The file descriptive of the signaling source SS may, for example, consist of an SDP file.

The broadcast signaling channel SC affords information on the transmission currently being broadcast, that is to say on the broadcast program PG, program broadcast on the IP network, that is to say on the INTERNET network or, in the case of a future broadcast, without having to reconnect from time to time to the WEB site of the station broadcasting the program PG.

The broadcast signaling channel SC makes it possible to convey enciphering information synchronized with the transmission changes originating from the audiovisual source SAV.

As far as the signaling channel SC is concerned, it is indicated that this signaling channel is a channel that all the receivers are in a position to receive. For this reason this broadcast signaling channel SC is separate from the stream or streams of broadcast content, which streams must necessarily attain high bit rates and which, consequently, cannot be received by all the terminals, on account of their sometimes limited specific capabilities.

Various alternative implementations of the protocol which is the subject of the present invention will now be described in conjunction with FIGS. 2b and 2c.

Figure 2B:
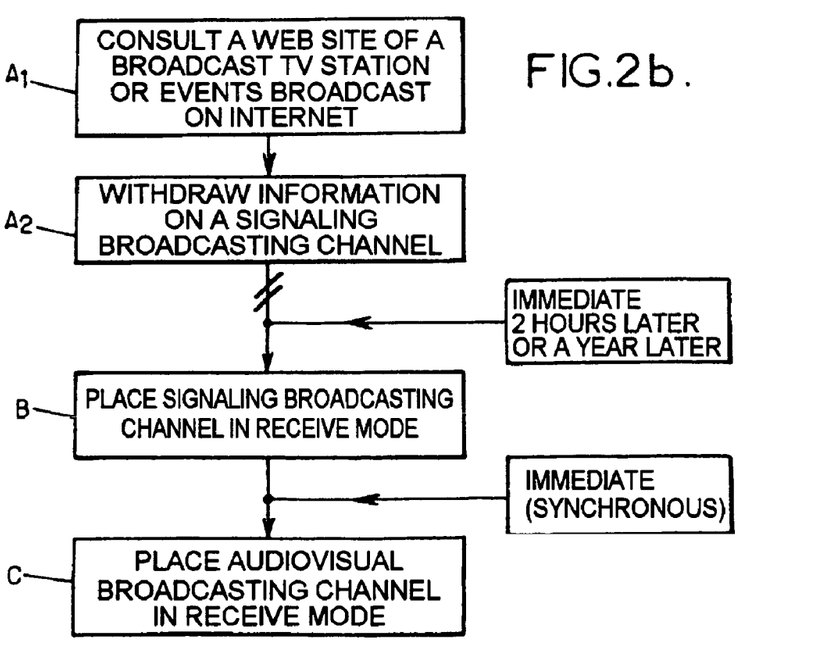

In a general manner, with reference to FIG. 2b, it is indicated that step A consisting in acquiring a file descriptive of the signaling source SS may consist of, and comprise, a first step A1 of issuing a request to transmit a corresponding file. This step A1 being followed by a step A2 consisting of a step of receiving the aforesaid file.

Step A1 can consist, for example, of an operation of consulting a broadcasting station WEB site, on the basis of broadcast televised stations or of events broadcast on the INTERNET network.

Step A2 can consist of a step of withdrawing information on a signaling broadcasting channel in the form of an SDP file.

As far as the implementation of steps B and C is concerned, with reference to FIG. 2b, it is indicated that the aforesaid steps B and C consisting in acquiring the broadcast signaling channel SC and in receiving on the terminal T at least one digital data stream supporting the audiovisual program are deferred. The implementation of steps B and C being of course subject to the sole initiative of the user.

Thus, with reference to FIG. 2b it is indicated that the implementation of steps B and C can be deferred by several hours, or even several months or even a year or more, after execution of step A of acquiring the SDP file descriptive of the signaling source SS.

Under these conditions, the file SDP descriptive of the signaling source is archived at the level of the terminal T with a view to the deferred access by the signaling source SS and to the audiovisual source with the aim of executing steps B and C later.

According to a noteworthy mode of implementation of the protocol which is the subject of the present invention, step B consisting in acquiring from the signaling source SS of the signaling channel SC can consist from the terminal T:

in issuing a request to receive a "MULTICAST" stream from the network to which the terminal T is interconnected and then in receiving the signaling channel broadcast in "MULTICAST" for example.

Finally, the succession of steps B and C is itself not deferred. The execution of the aforesaid steps B and C being successive and immediate.

Figure 2C:
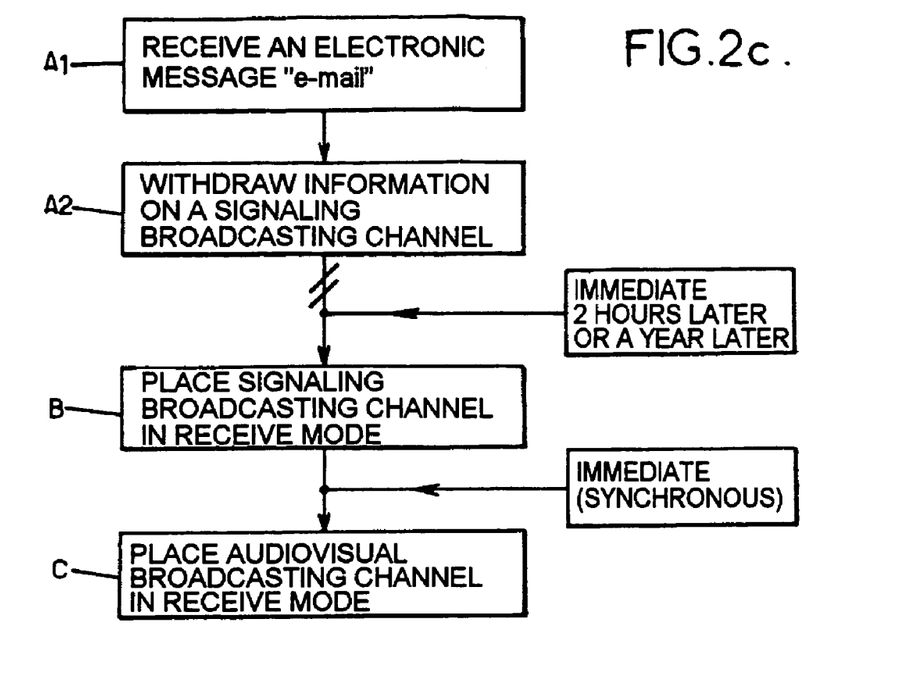

FIG. 2c represents a variant implementation of the protocol which is the subject of the present invention in which step A is carried out in a more flexible manner.

In particular, while, just as in the case of FIG. 2b, step A of acquiring a file descriptive of the signaling source SS is carried out in two steps A1 and A2, step A1 can consist advantageously of the straightforward reception of an electronic message designated by e-mail, this electronic message comprising a file attached to the latter as an attachment. This file constitutes the file such as an SDP file for example, which is then stored in the terminal T.

It is understood, under these conditions, that the withdrawal of the information on a signaling broadcasting channel is carried out in the simplest manner, since this operation consists of the storing of the aforesaid SDP file.

Of course, the SDP file in all cases of implementation either according to FIG. 2b, or according to FIG. 2c of the step of acquiring the SDP file descriptive of the signaling source SS, comprises a protocol for placing in receive mode the signaling source SS supporting the information for placing the audiovisual source SAV in receive mode.

Finally step C consisting in receiving on the terminal T at least one digital data stream supporting the audiovisual program PG can comprise a step of issuing a request for a digital data stream supporting this audiovisual program and a step of reception proper of the digital data stream supporting the aforesaid audiovisual program PG.

Furthermore, and in accordance with the "MULTICAST" broadcast process, it is indicated that the steps of issuing a request respectively of receiving the digital data stream supporting the audiovisual program PG may be repeated for the obtaining of a complete audiovisual signal or one of better quality.

A more detailed description of a system for broadcasting an audiovisual program from an audiovisual server to a set of terminals and in particular of a terminal T interconnected by way of the INTERNET network in accordance with the subject of the present invention and allowing the implementation of the protocol which is the subject of the invention described above will now be given in conjunction with FIG. 3.

Figure 3:
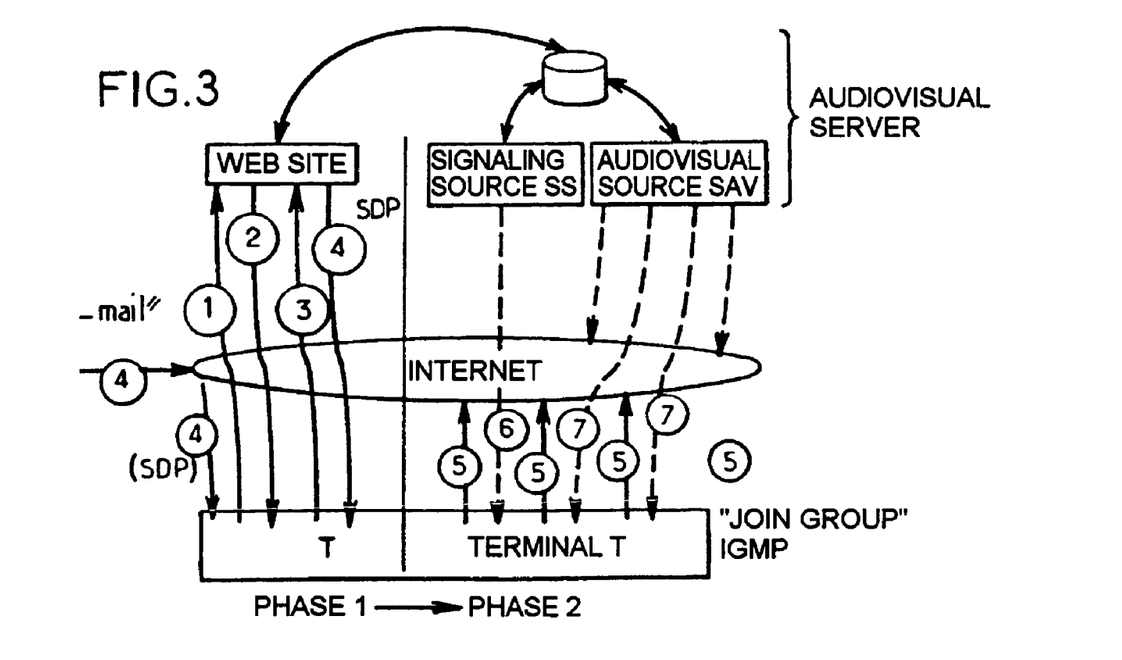
FIG. 3 represents, by way of illustration, a functional diagram of a system allowing the implementation of the protocol which is the subject of the invention.

In FIG. 3 is represented the terminal T interconnected by the INTERNET network, on the one hand to an audiovisual server WEB site such as a site of a station for telebroadcasting programs on the INTERNET network. The terminal T being, moreover, interconnected of course by way of the INTERNET network to the same audiovisual server, that is to say to the signaling source SS and to the audiovisual source the SAV.

Furthermore, and in a nonlimiting manner, it is indicated that the terminal T is of course suitable and capable of receiving electronic mail messages like any terminal normally available on the market.

In FIG. 3, the lines drawn dashed heading for the terminal T represent streams broadcast on the INTERNET network in so-called "MULTICAST" broadcasting mode. In particular only the dashed lines whose arrow head reaches the terminal correspond to streams received by the terminal T, the others representing digital data streams that do not reach the terminal in a manner known as such in MULTICAST broadcasting.

In particular, the streams broadcast in MULTICAST mode do not reach the terminal T unless the terminal has requested same through an IGMP command.

The description of the system which is the subject of the present invention will now be given in conjunction with FIG. 3 in the case where the implemented protocol which is the subject of the present invention corresponds substantially to the mode of implementation of FIG. 2a or of FIG. 2b.

In the aforesaid FIG. 3 it is indicated that:

the arrow 1 represents an HTML page request or enquiry sent by the terminal 1 to the WEB site of the audiovisual server;

the arrow 2 represents the reception of the HTML page requested by the terminal 1;

the arrow 3 represents an SDP file request or enquiry sent from the terminal T to the aforesaid WEB site; and the arrow 4 represents the reception of the SDP file by the terminal 1 from the aforesaid WEB site.

Finally in a nonlimiting manner, the previous operations representing step A and in particular steps A1 and A2 of FIG. 2b of implementation of the protocol which is the subject of the present invention, it is also indicated that the arrow 4 represented in FIG. 3 and designated e-mail represents the implementation of step A1 and of step A2 of FIG. 2b upon the reception of an attached file making up the SDP file.

For this reason and by analogy with the case of FIG. 2b the e-mail and SDP arrows referenced in FIG. 3 both bear the reference 4, since these operations allow the acquisition of an SDP file.

With reference to FIG. 3, it is recalled that operations B and C of acquiring a signaling channel SC then of acquiring on the terminal T a broadcast program PG from the signaling channel SC may be implemented either in a non-deferred manner subsequent to the acquisition of the SDP file, or on the contrary in a deferred manner.

In both cases and with reference to FIG. 3 the successive arrows represent:
- arrow 5: a MULTICAST stream reception request sent by the terminal 1 to the signaling source SS;
- arrow 6: the reception of the signaling channel SC broadcast for example in MULTICAST and for this reason represented by a dashed line in the arrow head reaches the terminal T;
- arrow 5: MULTICAST stream reception request addressed to the audiovisual source SAV;
- arrow 7: reception of a stream from the audiovisual source broadcast in MULTICAST, that is to say data of audiovisual programs PG.

In FIG. 3, two phases of implementation of the system which is the subject of the present invention according to the protocol described in conjunction with FIGS. 2a to 2c are distinguished. These two phases may be very far apart from one another in time or strung together, phase of acquisition, so-called phase 1, of the SDP data structure and phase of placing the audiovisual source in receive mode, so-called phase 2.

Various indications will now be given in relation to the execution of phases 1 and phase 2 respectively:
- phase 1: acquisition of the SDP data structure:
  in the first phase, so-called phase 1, the user connects up to the aforesaid WEB site by virtue of the use of a browser by providing the URL address of the site. The WEB site corresponding to the site of the station broadcasting the program PG. The URL address is a conventional address such as for example: http://wwww.SOURCE.FR/.

The terminal T receives in return an HTML page. This page may point to other pages or make it possible to perform searches with regard to transmissions of programs and broadcast stations.

When the user chooses a transmission or a television station by way of an arrow 3 he receives in return an SDP data structure via the arrow 4, which provides him with all the information for connecting up either immediately or in deferred mode to the broadcast signaling channel associated with the source that he has selected. The SDP file is then stored in the mass memory of the terminal T.

In the same way, as represented in FIG. 3, the aforesaid SDP file may also arrive at the terminal T as a file attached to an electronic message transmitted by a party who recommends the user of the terminal to consult or to view such and such a station or such and such a program PG.

However, in the case where the audiovisual source operates for example on a so-called "pay per view" mode the user must moreover acquire the entitlements to view the station or programs PG that he requests.

Phase 2: placing of the broadcast audiovisual source in receive mode.

Phase 2 begins immediately if the user has chosen to watch the program PG immediately and is repeated thereafter each time this user wishes to watch this program.

Phase 2 can on the contrary begin much later, in the case where the user has chosen a particular transmission programmed in the days which will follow the moment at which the retrieval of the SDP file has been performed. Such is in particular the case of a video recorder programmed to record a transmission in the absence of the user.

At the appropriate moment, that is to say on triggering of the aforesaid programmed video recorder, the terminal T analyzes the SDP data structure corresponding to the station or to the program PG selected so as to extract the information necessary for reception, such as the MULTICAST address, the address of the signaling source SS or the like. This information is the useful information providing for the placing in receive mode of the broadcast signaling channel SC corresponding to the audiovisual source by way of a "join group" IGMP command.

In this case the signaling channel arrow 6 receives all the information describing the mode of broadcasting of the audiovisual source and the terminal T can then place itself in immediate receive mode in one of the configurations used by the broadcasting source having regard to the necessary compatibility with the capabilities of the receiver, in terms of reception and decoding protocol access bit rate. It is indicated that one or more complementary streams may be transmitted by the source in accordance with the MULTICAST transmission mode.

With this aim, the receiver, by way of the terminal T, places itself in receive mode in respect of as many channels broadcast by the audiovisual source SAV by as many "join group 5" IGMP commands as there are program streams PG in the reception configuration adopted by the terminal T.

Each "join group" IGMP command then triggers the reception of one of the program streams PG from the source 7 in the terminal T.

As far as the broadcasting and the reception of a plurality of program streams PG in accordance with the MULTICAST transmission mode is concerned, it is indicated that this mode of transmission is known from the state of the art and that, accordingly, it will not form the subject of a more detailed description.

To provide for the implementation of the protocol and of the system that are the subjects of the present invention, with reference to FIG. 3, it is indicated that the audiovisual server comprises a signaling source SS allowing the reception from the terminals, and in particular from a given terminal T, of a signaling stream broadcast in MULTICAST. It also comprises an audiovisual source SAV allowing the reception from the terminals and from the terminal T of a digital data stream supporting the audiovisual program broadcast in MULTICAST.

However, and in order to provide for the implementation of the protocol and of the system which is the subject of the present invention under satisfactory reliability and security conditions, an extension is introduced into the syntax defined in the SDP file so as to indicate that the channel described is a broadcast signaling channel in the <media> command designated by "m".

A specific extension can consist of a character string (tv-sig) introduced into the aforesaid command.

Under these conditions, the new command can then take the form given below by way of non-limiting example:
c=IN IP4 224.2.1.1/127
m=Application 32416 UDP tv-sig The aforesaid command together with the field or extension "tv-sig" in the SDP structure makes it possible to indicate to the terminal T that the signaling channel is broadcast with the MULTICAST address IP4 224.2.1.1 and that its protocol, which is based on the UDP protocol, and its syntax are defined in the specification document designated by the character string "tv-sig".

In the signaling channel SC the source broadcasts information of the same type as that contained in the SDP file but this time in order to place itself in receive mode for the audiovisual contents broadcast by the source under the best conditions compatible with the potentialities of the terminal T in terms of access bit rate, protocol and decoding process.

The invention claimed is:

1. A method for broadcasting an audiovisual program towards a terminal by way of an Internet Protocol (IP) network, from an audiovisual source associated to a signaling source, said audiovisual program being supported by at least one digital data stream broadcasted on at least one program channel, wherein the method comprises the steps of, in said terminal:
   a) receiving on the terminal a file descriptive of said signaling source, wherein said file comprises broadcast information necessary for receiving a broadcast signaling channel associated to the audiovisual source, wherein said broadcast signaling channel is different from said at least one program channel broadcasting said at least one data stream supporting the audiovisual program;
   b) subsequent to the reception of said descriptive file, extracting the broadcast information necessary for receiving the broadcast signaling channel from the descriptive file;
   c) with the extracted broadcast information necessary for receiving the broadcast signaling channel, placing the terminal in reception of the broadcast signaling channel;
   d) receiving on the terminal, through the broadcast signaling channel, program information necessary for receiving the audiovisual program from the audiovisual source; and
   e) with the program information received through the broadcast signaling channel, receiving from said audiovisual source, on said terminal, said at least one program channel broadcasting said at least one digital data stream supporting said audiovisual program, via said network.
   wherein steps c), d), and e) are repeated for each audiovisual program received.

2. The method as claimed in claim 1, wherein said file descriptive of said signaling source is an SDP type file.

3. The method as claimed in claim 1, wherein the step
   a) of receiving on the terminal a file descriptive of said signaling source comprises:
      a step of issuing a request and of receiving an HTML page;
      a step of loading said file.

4. The method as claimed in claim 1, wherein steps c) and e) of placing the terminal in reception of the broadcast signaling channel and in receiving, on said terminal, at least one program channel broadcasting said at least one digital data stream supporting said audiovisual program are deferred, the file descriptive of said signaling source being archived at the level of said terminal with a view to deferred access to said signaling source and to said audiovisual source.

5. The method as claimed in claim 1, wherein said step c) of placing the terminal in reception of the broadcast signaling channel from said signaling source comprises, from said terminal:
   issuing a request to receive a multicast stream from the network;
   receiving said broadcast signaling channel broadcast in multicast.

6. The method as claimed in claim 1, wherein the succession of steps c) and e) is not deferred.

7. The method as claimed in claim 1, wherein step a) is executed on the basis of an operation such as the reception of an email comprising a file attached to the latter, which is stored in said terminal.

8. The method as claimed in claim 1, wherein said file comprises a protocol for placing in receive mode said signaling source supporting the information for placing said audiovisual source in receive mode.

9. The method as claimed in claim 1, wherein said step e) of receiving, on said terminal, at least one program channel broadcasting said at least one digital data stream supporting said audiovisual program comprises:
   a step of issuing a request for a digital data stream supporting this audiovisual program;
   a step of receiving said digital data stream supporting said audiovisual program.

10. The method as claimed in claim 1, wherein the program information received through the broadcast signaling channel is synchronized with changes in the at least one program channel broadcasting said at least one digital data stream.

11. The method as claimed in claim 1, wherein reception of the audiovisual program is not disturbed by a change in a mode of broadcasting of the at least one program channel.

12. The method as claimed in claim 2, wherein the step
   a) of receiving on the terminal an SDP file comprises:
      a step of issuing a request to transmit an SDP file;
      a step of receiving an SDP file.

13. The method as claimed in claim 9, wherein the steps of issuing a request respectively of receiving said digital data stream are repeated for the obtaining of a complete audiovisual signal or one of better quality.

14. A system for broadcasting audiovisual programs comprising:
   an Internet Protocol (IP) network;
   a set of terminals connected to the IP network;
   an audiovisual server connected to the set of terminals by way of the IP network, the audiovisual server comprising:
      a signaling source that broadcasts a signaling stream in multicast to be received by said terminals;
      an audiovisual source that broadcasts a digital data stream supporting the audiovisual program in multicast to be received by said terminals,
   wherein each terminal is arranged for receiving a file descriptive of said signaling source, the file comprising at least broadcast information data related to a broadcast signaling channel different from a program channel used for transmitting said digital data stream, and
   wherein program information necessary for reception of the program channel is received from the broadcast signaling channel, and
      wherein for each audiovisual program received by each terminal, the terminal receives the broadcast signaling channel using the broadcast information extracted from the file descriptive of said signaling source, the terminal receives the program information necessary for reception of the program channel through the broadcast signaling channel, and the terminal receives the program channel using the program information received through the broadcast signaling channel.

15. The system as claimed in claim 14, wherein reception of the audiovisual program is not disturbed by a change in a mode of broadcasting of the at least one program channel.

16. An audiovisual server for the broadcasting of audiovisual programs to at least one terminal interconnected to an Internet Protocol (IP) network, the audiovisual server comprising:
   an audiovisual source that transmits to the at least one terminal at least one digital data stream supporting a broadcast audiovisual program on at least one program channel;
   a signaling source that transmits to the at least one terminal a signaling stream on a broadcast signaling channel, said signaling stream providing said terminal with program information necessary for receiving the audiovisual program from the audiovisual source, said broadcast signaling channel being different from said at least one program channel transmitting said at least one digital data stream supporting the broadcast audiovisual program; and
   a data structure comprising a file descriptive of said signaling source, comprising broadcast information necessary for receiving a broadcast signaling channel associated to the audiovisual source, said file being transmitted to said terminal for placing the terminal in reception of the broadcast signaling channel, such that for,
   each audiovisual program received by said terminal, the terminal receives the broadcast signaling channel using the broadcast information extracted from the file descriptive of said signaling source, the terminal receives the program information necessary for reception of the program channel through the broadcast signaling channel, and the terminal receives the program channel suing the program information received through the broadcast signaling channel.

17. The audiovisual server as claimed in claim 16, wherein the program information provided through the broadcast signaling channel is synchronized with changes in transmitting the at least one digital data stream.

18. A terminal that receives, by way of an Internet Protocol (IP) network, an audiovisual program supported by at least one digital data stream broadcasted on at least one program channel, from an audiovisual source associated to a signaling source, said terminal comprising:
   a network connection that issues a request to transmit a file descriptive of the signaling source;
   a network connection that receives said file descriptive of the signaling source;
   an extraction element that extracts from the descriptive file broadcast information useful for receiving a broadcast signaling channel, said broadcast signaling channel being different from said at least one program channel;
   a signaling channel reception element that places the terminal in reception of the broadcast signaling channel, with the broadcast information extracted from the descriptive file, and that receives through said broadcast signaling channel, program information necessary for receiving the audiovisual program from the audiovisual source; and
   a program reception element that receives said at least one program channel broadcasting said at least one digital data stream supporting said audiovisual program, using the program information received through the broadcast signaling channel,
   wherein for each audiovisual program received by the terminal, the terminal receives the broadcast signaling channel using the broadcast information extracted from the file descriptive of said signaling source, the terminal receives the program information necessary for reception of the program channel through the broadcast signaling channel, and the terminal receives the program channel using the program information received through the broadcast signaling channel.

19. The terminal as claimed in claim 18, wherein reception of the audiovisual program is not disturbed by a change in a mode of broadcasting of the at least one program channel.

* * * * *